United States Patent [19]

Nelson

[11] 4,266,665
[45] May 12, 1981

[54] DISPENSER FOR CUP-SHAPED FILTERS
[75] Inventor: John R. Nelson, Palatine, Ill.
[73] Assignee: Research, Development & Marketing, Inc., Palatine, Ill.
[21] Appl. No.: 93,185
[22] Filed: Nov. 13, 1979
[51] Int. Cl.³ ................... B65D 85/62; B65D 83/04
[52] U.S. Cl. ................... 206/445; 206/449; 206/526; 220/69; 312/42; 221/63
[58] Field of Search ........... 206/556, 449, 445, 303, 206/526; 312/42; 221/63; 220/69

[56] References Cited
U.S. PATENT DOCUMENTS

| Re. 24,037 | 7/1955 | Willits | 206/445 |
| 1,463,098 | 7/1923 | Snyder | 220/69 |
| 1,541,532 | 6/1925 | Simmons | 206/499 |
| 1,664,521 | 4/1928 | Mayette | 220/69 |
| 2,112,959 | 4/1938 | Harvey | 206/499 |
| 2,568,413 | 9/1951 | Rubisch | 221/63 |
| 3,446,543 | 5/1969 | Matthews | 312/42 |

Primary Examiner—William T. Dixson, Jr.
Attorney, Agent, or Firm—Burmeister, York, Palmatier, Hamby & Jones

[57] ABSTRACT

A storage container and dispenser for cup-shaped filters for coffeemakers and the like utilizing a container with a pivotally attached cover and a basket within the container mounted on resilient blocks on the bottom of the container and having compression bars operable on opposite sides of the stack of filters to distort the shape of the stack of filters and facilitate removal of the innermost filter, the basket having posts which engage the cover as the cover is closed to depress the basket in the container against the resilient blocks.

4 Claims, 6 Drawing Figures

DISPENSER FOR CUP-SHAPED FILTERS

INTRODUCTION

The present invention relates to containers and particularly containers which facilitate dispensing of objects. More particularly, the present invention relates to dispensers for cup-shaped filters such as used in coffeemakers.

In recent years, automatic coffeemakers which use cup-shaped filters have come into general use. Such filters are constructed of thin sheets of porous material, usually paper, and the filters have a flat circular bottom surrounded by an outwardly flaring corrugated cup. The coffee grounds are generally carried in the filter, and hot water is either percolated or poured through the filter to produce the brew. A new filter is used each time a new charge of coffee is placed in the coffeemaker, thereby facilitating removal of the spent grounds and making certain that an effective filter is used with the next batch of coffee.

The filters are purchased by the consuming public in cartons which contain one or more stacks of closely grouped filters. One particular manufacturer packages 25 filters in a stack, and the stacks are compressed together to form a very tight unit. Four such stacks are placed in a single carton, one stack being positioned within another, to provide a carton with 100 coffee filters.

The stacks may be removed from the carton relatively easily, but it is much more difficult to remove a single filter from the stack. The edges of the filters are cut to approximately the same length and form a flat plane. To remove either the inner or the outer filter, it is necessary to catch only one filter by rubbing the finger or fingernail over the edge of the stack of filters, and it is more likely that a plurality of filters will adhere together and be removed as a group in this manner. It is one of the objects of the present invention to provide a device which will store a stack of coffee filters and facilitate the separation of the filters so that only a single filter may be removed with relative ease.

Coffeemakers as used by the consuming public are generally openly displayed in kitchens and offices. Often there is a lack of storage in the vicinity of the coffeemaker, and the coffeemaker itself provides no means for storing a supply of filters. It is a further object of the present invention to provide a dispenser which will have a pleasing appearance and which may be used to store coffee filters in visible locations, and particularly adjacent to the coffeemaker itself.

A stack of coffee filters assumes the form of an individual filter, namely, a circular base and an outwardly diverging corrugated conical wall extending from the base. The filters are generally used in this configuration in the coffeemaker, although in some circumstances they may be used with a cylindrical portion extending from the base. The present inventor has found that the individual interior filter may be removed more readily from the stack if two opposite sides of the diverging conical wall are pitched gently toward each other. By pinching two opposite sides toward each other, the edge of the inner filter tends to rise above adjacent filters, thus facilitating separation of the inner filter from the remainder of the stack. It is an object of the present invention to provide a container and dispenser for coffee filters which will pitch two confronting opposite sides of the stack toward each other and maintain the stack in this position to facilitate grasping of the interior filter of the stack.

It is also an object of the present invention to provide a coffee filter dispenser which has a pleasing appearance, and accordingly, a dispenser which is limited in size. By displacing opposite sides of the conical wall of a stack of coffee filters toward each other, the coffee filter stack is distorted, and the portions of the wall not forced toward each other are forced outwardly, thus resulting in a requirement for a larger container. It is a further object of the present invention to provide a dispenser for a stack of coffee filters which forces opposite sides of the conical wall of a stack of coffee filters together and avoids the necessity of a longer dimension for the container in a direction normal to the direction of the force on the stack.

The inventor has found that the objects of the present invention are accomplished by a coffee filter dispenser with a basket for a stack of coffee filters disposed within a container with a closable cover. The basket is mounted to rise in the container when the cover is opened, thereby making the filters readily accessible through the open top of the container, and the basket functions to force opposite sides of the wall of the stack of filters toward each other to facilitate separation of the inner filter from the remainder of the stack. The cover of the container may be closed after removal of the filter, and the action of closing the container cover is utilized to lower the basket causing the filters to descend into the container.

The advantages of the present invention will be more readily apparent in the following specification, particularly with reference to the accompanying drawings, in which.

Figure 1:
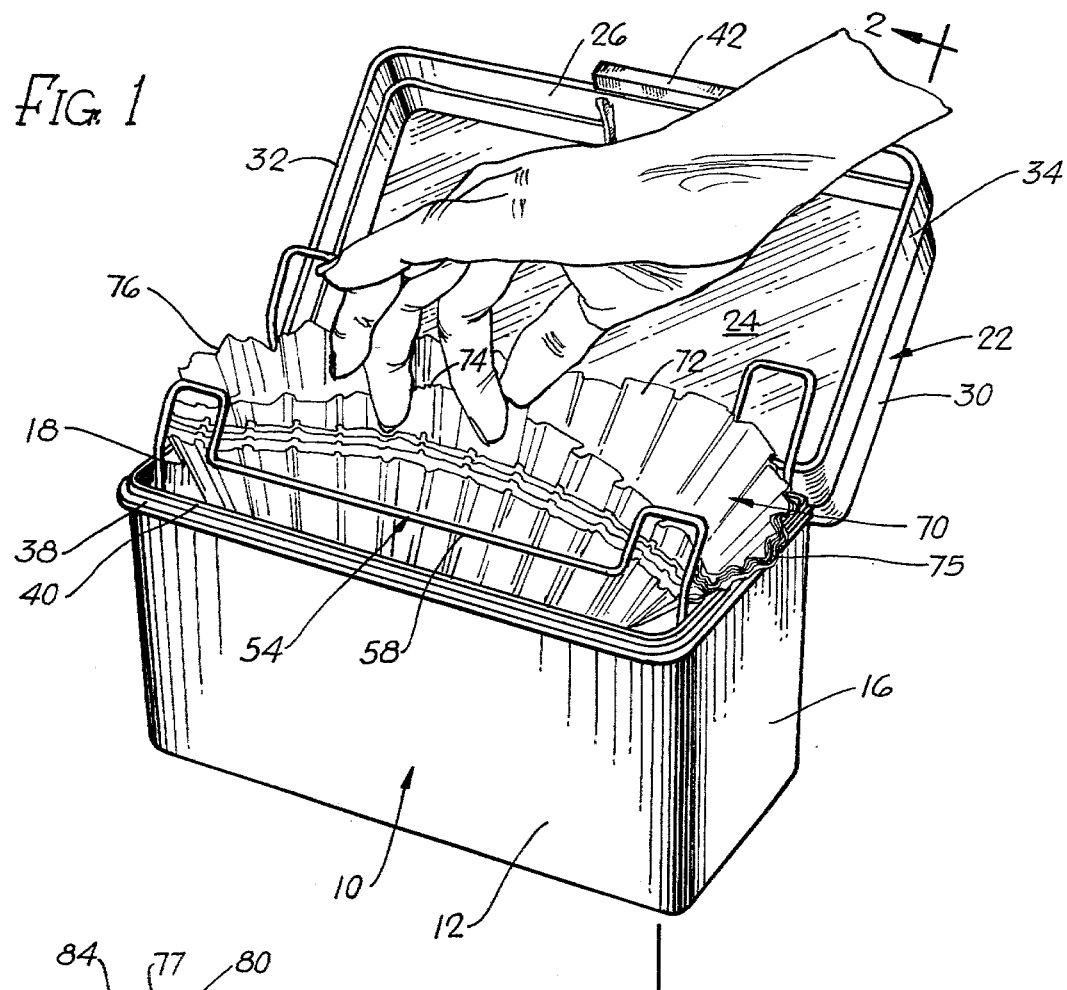
FIG. 1 is a perspective view of a dispenser for a stack of coffee filters, the stack being shown in position within the dispenser and the inner filter being shown in the process of removal.

As illustrated in the figures, the container itself has a rectangular box 10 with a front wall 12, back wall 14, side walls 16 and 18 and a bottom 20. The box 10 is open at the top 21 and the container has a cover 22 with a top 24, front wall 26, back wall 28 and end walls 30 and 32 which closes the top 21 of the box 10. The cover has an outwardly extending flange 34 which extends thereabout at its side opposite the top 24, and the back wall 28 of the cover is mounted on the back wall 14 of the bottom by a hinge 36 which extends from the flange 34 to the back wall 14 of the bottom. The bottom 10 and the cover 22 are constructed of plastic, and the hinge 36 is in the form of a strip of compliant plastic material, although it is to be understood that the hinge 36 may be a conventional leaf hinge.

The box 10 of the container is provided with an outwardly extending shoulder 38 adjacent to the upper edge 40 of the box but spaced therefrom. The edge of the flange 34 of the cover 22 is adapted to abut the shoulder 38 when the cover is in the closed position, thereby forming a closed and relatively dust free container. A latch 42 is disposed centrally of the front wall 26 of the cover 22 and protrudes downwardly, and the latch is provided with a lip 44 on its inner side confronting the front wall 12 of the box 10 when the cover is in the closed position. The lip 44 engages the side of the shoulder 38 opposite the cover 22 to retain the cover in closed and latched position.

A rack 46 is positioned within the box 10 of the container. The rack 46 has a platform 48 in the form of a thin rectangular panel, and the platform 48 is mounted on rectangular blocks 50 and 52 at opposite ends thereof. The blocks 50 and 52 are also secured on the bottom 20 of the box 10 of the container, as by cement, to secure the rack 46 in position. The blocks 50 and 52 are constructed of compressible resilient material, such as foam plastic.

The platform 48 is a part of a filter stack retainer which includes a forward stack compressor 54 and a rearward stack compressor 56. The forward and rearward stack compressors are formed integrally in the form of a wire basket which has a front bar 58 connected at opposite ends to posts 60 and 62 which extend through the platform to support bars 64 and 66. In like manner, the rear compressor 56 has a compressor bar 68 which is disposed parallel to the platform 48 adjacent to the back 14 of the container, and the stack of basket type filters, as shown in FIG. 1 and designated 70, is compressed between the forward bar 58 and the rearward bar 68. It will be noted from FIG. 1 that the innermost or uppermost filter, designated 72, separates from the remainder of the wall formed by the stack 70 of filters, and the edge 74 of that innermost filter 72 rises above the remainder of the stack as a result of the pinching or compression of the stack 70 between the bars 58 and 68. Hence, the innermost filter 72 may be more readily removed from the stack of filters than is possible from the stack in its conical form.

From FIG. 1 it will be noted that the portions 75 and 76 of the wall formed by the stack of filters adjacent to the ends 16 and 18 of the box 10 overlap these ends. If the cover 22 is simply closed on the box 10 of the container, these portions 75 and 76 of the stack will be wedged between the cover 22 and the box 10 of the container. To avoid this wedging, and to permit use of a smaller container, the platform 48 with its associated basket is lowered into the box 10 of the container on closing of the cover 22 by compressing the blocks 50 and 52. Initially, this is accomplished by two posts disposed at opposite ends of the bar 68 of the rearward compressor 56, the posts being in the form of wire fingers 77 and 78 which extend upwardly from opposite ends of the bar 68. The finger 77 has a rod 80 disposed parallel to the platform 48 and connected to one end of the bar 68 by means of a riser 82. The opposite end of the rod 80 is connected to a second riser 84 disposed parallel to the riser 82 and of approximately equal length therewith, and the riser 84 is connected at its end opposite the rod 80 on a post 86 which extends through the platform 48 and is connected on the support bar 66. The risers 82 and 84 are both inclined toward the back 28 of the cover 22 at an angle of approximately 20° to an axis normal to the platform 48.

The finger 78 is identical in construction to the finger 77 and has a bar 88 which corresponds to the bar 80 and risers 90 and 92 which correspond to the risers 82 and 84. The riser 90 is attached at its end opposite the bar 88 on a post 94 which extends through the platform 48 and is affixed to the support bar 64. The risers 90 and 92 are also inclined toward the back 28 of the cover at approximately the same angle as the risers 82 and 84 in the finger 77.

Figure 4:
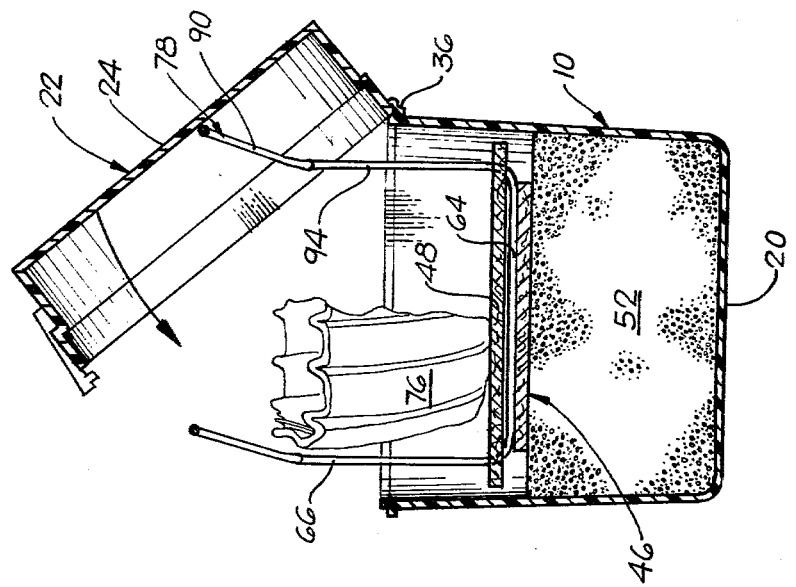
FIGS. 4, 5 and 6 are sectional views taken along the same plane as FIG. 2 with the cover open, partially closed, and more nearly closed, respectively.
Figure 5:
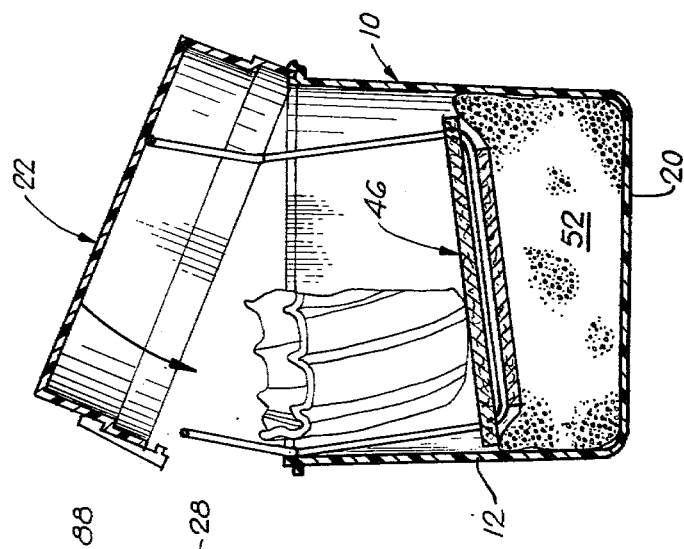
Figure 6:
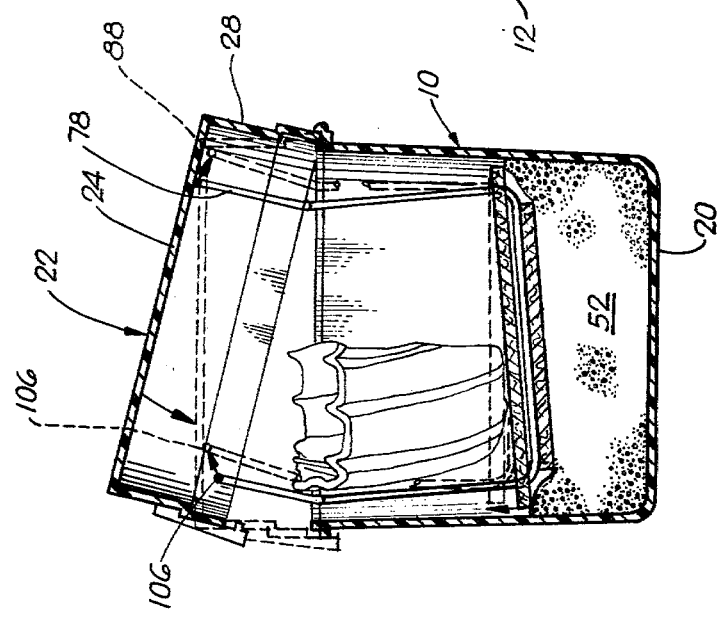

As best shown in FIGS. 4 through 6, the fingers 77 and 78 engage the top 24 of the cover 22 when the cover is pivoted on the hinge 36 to close the cover on the box 10. As a result, the rack 46 is pivoted toward the front wall 12 of the box 10, and also is forced downwardly against the resiliency of the blocks 50 and 52. The posts 86 and 94 extend substantially normally from the platform 48, and hence initially the force applied by the cover against the fingers 77 and 82 places a torque on the rack 46 until the cover is closed to the solid position shown in FIG. 6 in which the fingers 77 and 78 are substantially normal to the top 24 of the cover 22. In this position, the force from further closing of the cover 22 is exerted to drive the posts 86 and 94 toward the bottom 20 of the box 10. As the cover 22 is further closed, the rods 80 and 88 of the fingers 77 and 78 slide against the inner surface of the top 24 of the cover 22 toward the corner between the top 24 and the back wall 28, a position which the fingers 77 and 78 assume in the closed position of the container, as shown in dashed lines in FIG. 6.

The forward compressor 54 is also provided with a pair of fingers 96 and 98 which are similar to the fingers 77 and 78 of the rearward compressor 56. The finger 96 has a bar 100 disposed parallel to the front bar 58 and mounted on the front bar by a riser 102. In like manner, the end of the bar 100 opposite the riser 102 is connected to the post 62 through a riser 104. The post 62 is substantially normal to the platform 48, and the risers 102 and 104 incline toward the back wall 14 of the box 10, but at a somewhat lesser angle than the angle of the risers 82 and 84 with respect to the post 86.

In like manner, the finger 98 has a bar 106 disposed coaxial with the bar 100 and connected to the front bar 58 by a riser 108. The bar 106 is connected to the post 60 by a second riser 110.

Figures 2, 3:
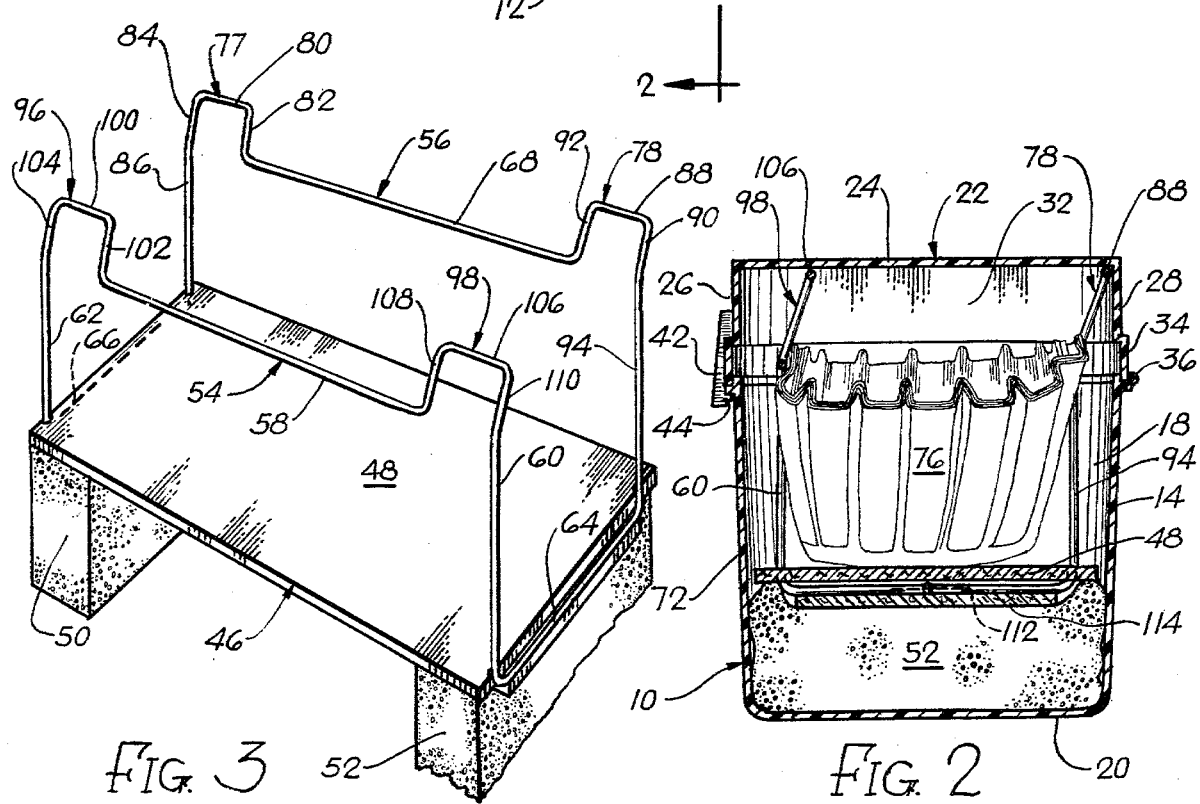
FIG. 2 is a sectional view of the container and filters taken along the line 2—2 of FIG. 1, the container being shown in closed position.
FIG. 3 is an isometric view of the holder for the filter stack shown in FIGS. 1 and 2.

It will be noted from FIG. 6 that the bars 100 and 106 are spaced from the top 24 of the cover 22 during a large portion of the process of closing the cover 22 on the box 10, and that the cover contacts the bars 100 and 106 when the cover approaches the closed position thereof. In the final portion of the process of closing the cover 22 on the box 10, however, the bars 100 and 106 engage the top 24 of the cover 22 to depress the rack 46 against the blocks 50 and 52, and thus cause the platform 48 to assume a position parallel to the bottom 20 of the box 10 when the cover 22 is in closed position, as illustrated in FIG. 2.

It will be noted that the posts 94 and 60 are connected to a common support bar 64, and the posts 62 and 86 are connected to a common support bar 66. The bars 64 and 66 may readily be attached to the underside of the platform 48, as by cement illustrated at 112. An underlayment strip 114 disposed on the side of the bars 64 and 66 opposite the platform 48 and cemented or otherwise secured to the platform 48 further insures a secure fastening for the support bars 64 and 66 on the platform 48.

Those skilled in the art will note uses and advantages of the structure described above and shown in the figures in addition to those here set forth. It is therefore intended that the scope of the present invention be not limited by the disclosure, but only by the appended claims.

The invention claimed is:

1. A device for storing and facilitating retrieval of stacked paper cups such as filters used in coffeemakers comprising, in combination:
   a container having a lower portion with a bottom, and walls extending from the bottom to form an open top, and a cover which mates with the lower portion, the cover having a perimitral portion mounted in hinged relationship on a confronting portion of the lower portion and forming with the lower portion a substantially closed container,
   a platform having a cross section smaller than the bottom of the container,
   yieldable resilient means mounted on the lower portion of the container and the platform for mounting the platform in spaced apart relationship with the base of the container,
   and a basket adapted to hold a stack of cups mounted on the platform, said basket having a post extending away from the platform adjacent to the perimitral portion of the cover, said post extending from the platform a distance greater than the distance between the platform and the top of the lower portion of the container and less than the distance between the bottom of the lower portion of the container and the cover.

2. A device comprising the combination of claim 1 wherein the container bottom is rectangular and the platform has a rectangular cross section, and the basket has a pair of posts disposed at opposite ends of the platform.

3. A device comprising the combination of claim 2 wherein the yieldable resilient means comprises two spaced blocks of foam plastic material, one of said block being disposed between one end of the platform and the base of the container and the other block being disposed between the other end of the platform and the base of the container.

4. A device for storing and facilitating removal of a cup from a stack of paper cups such as filters used in coffeemakers comprising, in combination:
   a container having a lower portion with a rectangular bottom and two pair of parallel spaced walls extending normally from the bottom, the walls of one pair being normal to the walls of the other pair and the walls of one pair being attached to the walls of the other pair to form the rectangular lower portion with an opening on the side of the lower portion opposite the bottom,
   the container having a cover with a rectangular top and two pairs of parallel spaced walls extending normally from the top, and walls of one pair being normal to the walls of the other pair and the walls of one pair being attached to the walls of the other pair to form the cover with a rectangular opening confronting the top, said container having a hinge joint disposed between the end of one of the walls of the cover opposite the top and the end of one of the walls of the lower portion opposite the bottom, the hinge joint positioning the cover into alignment with the lower portion to form a container with a mating and openable cover,
   a platform having a cross-section smaller than the bottom disposed in the lower portion of the container confronting the bottom thereof,
   a pair of rectangular blocks of resilient foam material having one side mounted on the bottom of the container in spaced relation, the opposite side of said blocks being mounted on the platform,
   an elongated basket mounted on the platform.

* * * * *